US012426997B2

(12) United States Patent
Raiser (10) Patent No.: US 12,426,997 B2
(45) Date of Patent: Sep. 30, 2025

(54) DENTAL REPLACEMENT HAVING A CONNECTING SLEEVE (71) Applicant: 3CI GMBH, Neckarbischofsheim (DE)

(72) Inventor: Christoph Raiser, Guèrande (FR)

(73) Assignee: 3CI GMBH (DE)

( * ) Notice: Subject to any disclaimer, the term of this patent is extended or adjusted under 35 U.S.C. 154(b) by 919 days.

(21) Appl. No.: 17/297,685

(22) PCT Filed: Dec. 9, 2019

(86) PCT No.: PCT/EP2019/084200
§ 371 (c)(1),
(2) Date: Dec. 1, 2021

(87) PCT Pub. No.: WO2020/120389
PCT Pub. Date: Jun. 18, 2020

(65) Prior Publication Data
US 2022/0087785 A1 Mar. 24, 2022

(30) Foreign Application Priority Data
Dec. 11, 2018 (EP) ..................... 18211513

(51) Int. Cl.
A61C 8/00 (2006.01)
A61C 13/08 (2006.01)
(52) U.S. Cl.
CPC .......... A61C 8/0063 (2013.01); A61C 8/0054 (2013.01); A61C 8/0062 (2013.01);
(Continued)

(58) Field of Classification Search
CPC ............................. A61C 8/00–0098
See application file for complete search history.

(56) References Cited

U.S. PATENT DOCUMENTS 4,850,873 A * 7/1989 Lazzara ................. A61C 8/005
433/173
5,116,225 A * 5/1992 Riera ..................... A61C 8/006
433/173
(Continued)

FOREIGN PATENT DOCUMENTS

DE 102 51 214 A1 5/2004
EP 0313222 A2 4/1989

Primary Examiner — Yogesh P Patel
(74) Attorney, Agent, or Firm — Frank H. Foster; Kremblas & Foster (57) ABSTRACT A dental prosthesis (100) for anchoring in the jawbone (1), comprising a dental implant (110) with an implant body (111) and an abutment (112), a tooth part (120) with an internal guide (122) in the tooth part (120), in particular penetrating the tooth part (120), and a closure body (130) for sealing the dental prosthesis (100) within the internal guide (122) in the tooth part (120), in particular penetrating the tooth part (120). A connecting sleeve (140) is arranged between the closure body (130) and the internal guide (122) of the tooth part (120), by means of which connecting sleeve the tooth part (120) and the dental implant (110) can be connected to one another indirectly, detachably and/or by means of which connecting sleeve the closure body (130) can be releasably locked within the internal guide (122) in the tooth part (120), in particular penetrating the tooth part (120).

11 Claims, 9 Drawing Sheets (52) U.S. Cl.
CPC .......... *A61C 8/0068* (2013.01); *A61C 8/0074* (2013.01); *A61C 13/082* (2013.01)

(56) References Cited

U.S. PATENT DOCUMENTS

| | | | | |
|---|---|---|---|---|
| 5,733,122 | A * | 3/1998 | Gordon | A61C 8/0068 433/172 |
| 9,433,482 | B2 * | 9/2016 | Shimoda | A61C 8/0089 |
| 2003/0224328 | A1 * | 12/2003 | Sapian | A61C 8/0086 433/173 |
| 2011/0053114 | A1 * | 3/2011 | Shimoda | A61F 2/18 623/4.1 |

* cited by examiner

DENTAL REPLACEMENT HAVING A CONNECTING SLEEVE

BACKGROUND OF THE INVENTION

The invention relates to a dental prosthesis for anchoring in the jawbone, comprising a dental implant with an implant body and a structural element, a tooth part with an internal guide arranged in the tooth part, in particular penetrating the tooth part, and a closure body which can be arranged for sealing the dental prosthesis within the internal guide penetrating the tooth part. The invention also relates to a kit for sealing a dental prosthesis, in particular a dental prosthesis for anchoring in the jawbone, with a closure body and a connecting sleeve.

The present invention involves the dental field of implant prostheses. In the event of the loss of one's own tooth root, a dental implant offers the possibility of fastening the actual dental prosthesis, which is also referred to as a tooth part or prosthesis, for example a crown. The dental implant is implanted in the patient's jawbone and acts there as a tooth root replacement and support for the tooth part. The structure of a dental implant consists of the implant body, which is usually made of titanium and is screwed into the jawbone by means of a screw thread, and of the structural element, also known as an abutment, which protrudes from the jawbone in order to attach the tooth part thereto, in particular a crown. The abutment or structural element serves as a so-called load-bearing component, which supports the tooth part and absorbs the forces and torques acting on the dental prosthesis, for example during chewing or biting, and transfers those to the implant body. A basic distinction is made between one-piece and two-piece dental implants. In the case of a one-piece dental implant, the implant body and the structural element are formed integrally, i.e. as one piece. In the case of a two-part dental implant, the implant body and the structural element are designed as two individual pieces, separate from one another. Only after the healing of the implant body inserted into the jawbone is complete is the implant body connected to the structural element via a connecting element, usually a dental implant screw. For this purpose, both the implant body and the structural element have an internal connecting section which is expediently provided with an internal thread. The tooth part, in particular the crown, is then connected to the structural element. When using two-part implants, however, it has been found that the screw connection between the implant body and the abutment or structural element represents a weak point. The tooth implant screw often becomes loose due to the forces and torques acting on the abutment or structural element, which creates a kind of "jolting" on the screw.

With regard to the tooth part or the crown, a fundamental distinction must be made between two common variants. In one variant, the tooth part is provided with a lower recess that is complementary to the structural element and is bonded to the structural element. Subsequent loosening or replacement of the tooth part is not possible here or only with heavy load on the implant anchored in the jawbone. In the case of a two-part implant design, in which, as described above, the implant screw can often become loose, such bonding has proven to be a particular disadvantage. In order to correct the connection between the structural element and the implant body, i.e. specifically to retighten the connecting screw, it is necessary to loosen the tooth part in the manner described above, which in most cases results in damage or destruction of the tooth part and/or even the structural element.

In the other variant, the tooth part is penetrated by an internal guide, in particular by a cylindrical channel, and is bonded to the structural element before the structural element and the implant body are connected to one another. The screw provided for the connection can then be guided and screwed in through the channel or the internal guide. In order to prevent the penetration of bacteria, the channel must be closed after the tooth part has been attached. This is usually realized by means of a polymer adhesive, which is filled into the channel in a deformable state and then cured therein. The disadvantage of the polymer adhesive is that not only is the channel sealed, but at the same time the screw is also bonded inside the channel, which means that the crown can no longer be removed without being destroyed.

A fixed dental prosthesis with a superstructure and a dental implant, which are fastened to one another via a connecting element arranged within a channel, is known from the prior art, namely DE 20 2013 105 551 U1. In order to close the channel, a closure element is provided, which is also releasably fastened in the superstructure by means of a so-called releasable locking device. The releasable connection between the locking device and the superstructure is realized by means of a thread, the locking device having an external thread and the superstructure itself being provided with an internal thread.

U.S. Pat. No. 5,890,902 also relates to a dental prosthesis with a root section and a crown section, the crown section being provided for receiving a crown. The crown has a channel-like cavity through which a connecting rod is guided in order to connect the crown or the crown section to the root section. In order to close the cavity and to seal it against saliva, a closure element is provided which has a disk-like basic body with an external thread surrounding it. A recess, which is designed for engagement with a wrench, is molded into the top of the closure element. As a result, the closure element can be screwed into the cavity or also removed again from the crown.

A disadvantage of the closure elements known from the prior art is that, in order to fasten the respective closure body, it is necessary to cut an internal thread into the superstructure or the crown body itself. Particularly in the case of crowns or similar dental prostheses made of ceramic materials, cutting a thread with the required accuracy and the required degree of fineness is particularly time-consuming and costly. The tools required for this, in particular diamond tools in such a small design, are often not available at all or only with difficulty.

It is therefore the object of the present invention to improve the dental prosthesis known from the prior art, in particular to create a more cost-effective way of being able to detach a tooth part from a dental implant in a non-destructive manner. At the same time, it should also be possible to retrofit an existing dental prosthesis with a sealing kit.

SUMMARY OF THE INVENTION

The object is achieved by means of a dental prosthesis according to claim 1 and a kit. A dental prosthesis according to the invention of the type described in more detail at the beginning is characterized in that a connecting sleeve is arranged between the closure body and the internal guide of the tooth part, by means of which connecting sleeve the tooth part and the dental implant are indirectly, in particular releasably, connectable to one another, and/or the closure body is releasably lockable within the internal guide arranged in the tooth part, in particular penetrating the tooth part.

According to the invention, the connecting sleeve, which is arranged as an additional, individual, and particularly one-piece component within the internal guide of the tooth part and which is surrounding the closure body, fulfills several functions. On the one hand, it is provided that the tooth part or the prosthesis, in particular a crown, is connected indirectly to the dental implant by means of the connecting sleeve. In contrast to what is known in the prior art, the tooth part is then no longer connected directly to the tooth implant or to the structural element thereof itself but indirectly via the connecting sleeve, thereby avoiding adhesive connections between the tooth part and the structural element. This indirect connection is preferably designed to be detachable. On the other hand, the connecting sleeve can alternatively or additionally also fix the closure body inside the tooth part in order to seal the internal guide arranged in the tooth part, in particular penetrating the tooth part, and thus to reduce the penetration of saliva, dirt, or bacteria or, at best, even to prevent it completely. According to the invention, the closure body is releasably locked within the tooth part by means of the connecting sleeve, whereby it can be removed non-destructively, i.e. without damaging the tooth part, in particular the crown, or the tooth implant, in order to enable access to the tooth implant underneath and, if necessary, the tooth implant screw. Furthermore, the components of the dental prosthesis, the production of which is particularly complex and associated with high costs, namely the tooth part and the dental implant, are protected from damage by the connecting sleeve.

Overall, according to the invention, a flexible design is made possible in which individual components of the dental prosthesis, the tooth part or the prosthesis, the structural element or abutment, and/or even the implant body can be removed when needed or optionally from the oral cavity or from the jawbone of the patient in order to be replaced with a respective replacement part if necessary. The remaining components of the dental prosthesis can then be used again at low cost.

Advantageous embodiments are claimed in the dependent claims and explained in more detail below.

Thus, according to an advantageous embodiment of the invention, it is provided that the tooth implant is designed in two parts and has a connecting section penetrating the implant body and the structural element, also called abutment, as well as a connecting element that can be arranged within the connecting section, in which the closure body can be arranged within the internal guide arranged in the tooth part, particularly penetrating the tooth part, and opening into the connecting section penetrating the structural element.

As described above, in the case of a two-part design of the dental implant, the implant body is connected to the structural element via a connecting element. For this purpose, the implant body as well as the structural element each have a connecting section; the connecting section of the implant body is usually designed as an internal thread, with the connecting element being a screw. It is particularly expedient if the closure body opens into the connecting section of the structural element, i.e. projects into it. In this way, on the one hand, an exact axial alignment of the closure body in relation to both the tooth implant and the tooth part can be ensured. On the other hand, the closure body can also act as a screw lock or anti-twist lock for the tooth implant or the connecting screw between the structural element and the implant body. For example, it is conceivable to provide the lower section of the closure body with a spring-like projection which positively engages in a groove or similar recess in the screw head of the connecting screw.

An embodiment is also advantageous in which the connecting sleeve is designed as a, in particular rotationally symmetrical, hollow cylinder, with an outer jacket surface and an inner jacket surface, wherein the outer jacket surface preferably encloses the inner jacket surface coaxially, and has an upper annular surface, which is assigned to a chewing surface of the tooth part, and a lower annular surface, which is assigned to the structural element and/or to the dental implant, and wherein, in particular, the upper annular surface and the lower annular surface are aligned parallel to one another.

This geometrically simple configuration enables, for example, a particularly cost-effective production in that connecting sleeves can be produced from semi-finished products, in particular hollow cylindrical goods by the meter, or they can be axially separated therefrom.

In a refinement of this embodiment, it is provided that the connecting sleeve can be aligned coaxially with the structural element in the internal guide arranged in the tooth part, in particular penetrating the tooth part, wherein either the lower annular surface of the connecting sleeve terminates axially at or above an upper end of the structural element, or the connecting sleeve is surrounded, in particular completely, by the structural element, wherein particularly the upper annular surface of the connecting sleeve terminates at or below the upper end of the structural element.

In other words, it is provided that the connecting sleeve and the structural element are arranged either consecutively or adjacent to one another with respect to the axial direction, the connecting sleeve being located above the structural element with respect to the chewing surface. Or, in the event that the structural element and the connecting sleeve overlap one another or are arranged surrounding one another along the axial direction, it is provided that the connecting sleeve is always, in particular completely, positioned within the structural element or always, in particular completely, surrounded by the structural element.

Both of the above-mentioned arrangement options from the connecting sleeve to the structural element have the effect that the connecting sleeve does not act as a load-bearing component, unlike the structural element, which is used to absorb the forces occurring during chewing and/or biting.

In contrast, as also described at the beginning regarding the prior art, the structural element is provided to support the tooth part. The force and/or torque transmission from the tooth part to the structural element usually takes place from the inner surface or inner jacket surface of the tooth part to the positively connected outer surface or outer jacket surface of the structural element. According to the arrangement alternatives provided in the refinement of the invention, it is ensured in each case that the force and/or torque transmission continues to take place exclusively between the structural element and the tooth part, and not via the connecting sleeve.

In this context, it should be noted that such a connecting sleeve, together with the closure body, can be used universally for anatomical dental prostheses, in particular anatomical crowns. This also makes it possible to retrofit implant systems that have already been implanted in the jawbone of a patient.

Furthermore, the connecting sleeve is arranged in the area of the dental prosthesis, in particular exclusively in the area of the dental prosthesis, and is thus to be regarded as a component of the dental prosthesis and not of the implant.

As an additional function, in the arrangement options described above, the connecting sleeve can serve as a screw lock for the connecting section, in particular the implant screw, in order to prevent the loosening of same as described at the beginning.

For the function, it is advantageous according to one embodiment if the closure body has an external thread and the connecting sleeve has at least one internal thread in order to releasably lock the closure body within the internal guide arranged in the tooth part, in particular penetrating the tooth part.

The external thread of the closure body and the at least one internal thread of the connecting sleeve together form a threaded connection, by means of which the closure body can be screwed into the connecting sleeve and also unscrewed from it again. Instead of the tooth part itself, the connecting sleeve is thus provided with the internal thread. With this procedure, it is particularly advantageous that the closure body and the connecting sleeve can be produced to match one another and can then be used with a standardized tooth part. The threaded connection also applies an axial pressing force in the direction of the dental implant, which reduces and closes any microgaps, e.g. between the implant body and the structural element, and overall a better, preferably bacteria-free and/or germ-free, fit of the dental prosthesis is obtained. A non-positive or frictional fit is formed between the connecting sleeve and the tooth part, more precisely the internal guide thereof, due to screwing in the closure body. The connecting sleeve preferably functions like a type of dowel, with the screwed-in closure body exerting a pressing force directed radially outward, in the direction of the surrounding tooth part. Due to the threaded or screw connection between the closure body and the connecting sleeve, a releasable connection with the tooth part can thus be created at the same time. If the closure body is removed from the connecting sleeve, the connecting sleeve can also be removed from the internal guide of the tooth part. Alternatively, it is also expedient to firmly connect the connecting sleeve to the internal guide of the tooth part by means of an adhesive connection.

In addition to the threaded connection described above or as an option, a snap connection is also conceivable between the closure body and the connecting sleeve according to an expedient embodiment. For this purpose, the closure body can have at least one spring element and the connecting sleeve at least one complementary recess or groove in order to releasably lock the closure body within the internal guide arranged in the tooth part, in particular penetrating the tooth part.

It is also advantageous if the structural element has an external threaded section for engaging at least one internal thread of the connecting sleeve in order to releasably connect the dental implant to the connecting sleeve.

According to such an advantageous embodiment, the connecting sleeve can, for example, also be provided with two internal threads. A first internal thread can then be used for connection to the closure body, whereas a second internal thread, arranged below the first, can be used for connection to an external thread of the structural element. If the structural element has a diameter that differs from the closure body, the second internal thread can be arranged radially offset from the first internal thread, namely inward for a smaller diameter of the structural element and outward for a larger diameter of the structural element. The additional threaded connection between the connecting sleeve and the structural element enables the axial pressing force acting in the direction of the tooth implant to be increased. At the same time, the connecting sleeve forms both a releasable connection with the closure body and with the structural element or the dental implant. Due to the pressing force acting radially outward in the direction of the tooth part, an additional non-positive and/or frictional fit can be achieved between the connecting sleeve and the tooth part.

An optional embodiment of the invention provides that a collar section of the tooth part is arranged between the connecting sleeve and the structural element of the dental implant in order to releasably connect the tooth part and the tooth implant to one another by means of the connecting sleeve.

The tooth part preferably has an inwardly directed collar section at its lower end assigned to the dental implant; in other words, the internal guide is designed with an inwardly directed shoulder. The collar section of the tooth part can be arranged between the tooth implant, in particular a corresponding flange section of the structural element, and the connecting sleeve. That is, the tooth part is first pushed onto the structural element adjacent to the flange section of the structural element, and then the connecting sleeve is pushed into the internal guide of the tooth part, its lower end being supported on the collar section of the tooth part. By screwing the closure body into the connecting sleeve or snapping it into place by means of the snap connection, the threaded and/or snap connection exerts an axial pressing force in the direction of the tooth implant, and the tooth part is fixed on the tooth implant indirectly, through the connecting sleeve, and releasably in this way.

It is particularly advantageous if at least one seal is arranged between the closure body and the connecting sleeve.

A seal, for example in the form of a sealing washer, a sealing cone, an O-ring, or other expedient seal designs, can further increase the tightness between the closure body and the connecting sleeve. Optionally, it is also conceivable to arrange additional seals between the connecting sleeve and the structural element and/or the tooth part. Alternatively, it is also conceivable to form a sealing surface, in particular a conical sealing surface, between the closure body itself and the connecting sleeve. For this purpose, the closure body and the connecting sleeve can each be designed with a conical outer or inner surface in the upper area thereof, which surfaces are arranged complementary to one another.

According to an advantageous variant, the closure body comprises an inner recess, in particular an internal thread, for receiving a core element, in particular a grub screw, and/or a silicone core.

Since the closure body has, for example, an internal thread for receiving a grub screw, preferably an Allen screw, it is possible to unscrew the closure body from the connecting sleeve by means of the grub screw. For this purpose, the grub screw can be screwed into the closure body or its internal thread with an Allen key until its lower section touches the connecting element, i.e. the implant screw, so that further screwing in of the grub screw leads to the closure body being unscrewed from the connecting sleeve. A seal formed between the closure body and the connecting sleeve in the form of two conical sealing surfaces, i.e. a conical connection, can also be loosened in this way.

The closure body can, however, also have an inner recess for a silicone core. The particular advantage here is that the closure body may have a tool holder, for example in its upper area, i.e. in the upper area of the inner recess, for engaging with a wrench and/or Allen key in order to screw the closure body itself into or unscrew it out of the connecting sleeve. By filling the inner recess with a silicone core, the tool holder can be sealed so that, among other things, the ingress of bacteria or germs is prevented. Due to the elastic properties of the silicone material, the silicone core can be pressed in or compressed in order to gain access to the tool holder. The silicone core then springs back to its original position. The silicone core can also be easily removed using a suitable dental tool.

Even if a positive connection between the connecting sleeve and the internal guide of the tooth part is basically conceivable, it is advantageous if the connecting sleeve has a flat, in particular smooth, outer surface, and/or the internal guide arranged in the tooth part, in particular penetrating the tooth part, has a flat, in particular smooth, surface.

In this manner, it can be ensured that the connecting sleeve can be pushed smoothly, particularly in a precisely fitting manner, into the internal guide arranged in the tooth part, in particular penetrating the tooth part, and also removed from it again without damaging the tooth part or the surface of the internal guide. As described above, a connection can then be achieved between the connecting sleeve and the tooth part by means of a radial pressing force and the resulting non-positive and/or frictional engagement. In addition, the production of a tooth part with an internal guide, which has a smooth, flat surface is associated with less effort than, for example, a tooth part with an internal thread.

Furthermore, an advantageous exemplary embodiment provides that the connecting sleeve comprises a material that has a lower hardness than the hardness of the material of the tooth part. The connecting sleeve is preferably made of plastic but could also contain a ceramic or metallic material. The use of a material with a low hardness, in particular plastic, makes it possible to provide the connecting sleeve with an internal thread inexpensively and with little effort. Other connecting elements can also be easily implemented, for example by machining or by injection molding. By using an at least partially elastic material, an improved seal can also be produced between the connecting sleeve and the internal guide arranged in the tooth part, in particular penetrating the tooth part. Since the material of the connecting sleeve has a lower hardness than that of the material of the tooth part, in particular of a ceramic crown, the connecting sleeve can also be designed as a predetermined breaking part, so that, when mechanical loads occur during assembly and/or disassembly of the dental prosthesis, any damage only affects the connecting sleeve. In the simplest version, the connecting sleeve can therefore be a simple plastic tube with an internal thread.

Finally, according to an exemplary embodiment of the invention, the tooth part, the sleeve, and/or the closure body are designed with a respective, preferably the same, color corresponding to a natural tooth color.

The tooth color can be, for example, Vita A1-D4. This offers the advantage that the tooth part, in particular the crown, and the closure body, which together with the tooth part forms the surface of the dental prosthesis, have a matched visual appearance and similar, in particular identical, material properties. In addition, the overall material requirement can also be reduced. For example, the tooth part together with the closure body could be milled, in a computer-controlled manner, from a single, pre-colored ceramic block with a natural color gradient. Such milling methods can be implemented, for example, by means of a CAD/CAM machine and/or a 3D plotter, etc.

A ceramic or glass ceramic (e.g. a lithium disilicate glass ceramic), in particular zirconium oxide, is preferably used as the material for the tooth part and the closure body, a titanium compound is preferably used for the tooth implant, and a plastic is preferably used for the connecting sleeve. Any other materials certified for the dental field can also be used.

A kit is included within the scope of the inventive idea for retrofitting, i.e. for subsequent sealing of a dental prosthesis, in particular a dental prosthesis intended to be anchored in the jawbone of a patient. The kit comprises a closure body and a connecting sleeve, wherein the connecting sleeve can be releasably arranged within an internal guide arranged in the dental prosthesis, in particular penetrating the dental prosthesis, and the closure body can be releasably locked within the connecting sleeve.

Previously milled ceramic crowns, which are intended for use with an implant, can be retrofitted and sealed, for example, with the kit according to the invention.

It is particularly advantageous if the kit additionally contains a tooth part, which tooth part is penetrated by an internal guide, wherein an outer surface of the connecting sleeve is at least partially bonded to the surface of the internal guide and/or is pressed into the internal guide.

In one embodiment in which the kit also includes the tooth part, it is particularly useful if the connecting sleeve is already firmly connected to the tooth part, i.e. is bonded into it. It is particularly advantageous to connect the connecting sleeve to the tooth part by means of a soldered connection, in particular a glass solder. In the application, the finished tooth part with the connecting sleeve, which is bonded and/or pressed and/or soldered therein, are placed on the dental implant, in particular on the structural element thereof, and then the closure body is snapped and/or screwed into the connecting sleeve in order to seal the dental prosthesis. The upper section of the closure body protruding beyond the tooth part can then be ground off by the dentist on-site and brought to a level with the chewing surface of the tooth part. In addition, this embodiment offers the advantage that, as already described above, the tooth part and the closure body can be milled from a common ceramic block.

Finally, according to an optional variant of the kit according to the invention, a structural element can also be included, which structural element can be connected to an implant body via a connecting element, and the connecting sleeve can be aligned coaxially with the structural element in the internal guide arranged in the tooth part, in particular penetrating the tooth part, wherein either the lower annular surface of the connecting sleeve terminates axially at or above an upper end of the structural element, or the connecting sleeve is coaxially, in particular completely, surrounded by the structural element, and in particular the upper annular surface of the connecting sleeve terminates at or below the upper end of the structural element.

In this embodiment, it is conceivable that the implant body of the implant has already been inserted into the jawbone of the patient and the healing process is complete. During insertion of the tooth part, first the structural element contained in the kit is placed and then the tooth part, which is preferably shaped to complement the structural element. By inserting the connecting element, preferably a screw, the structural element is releasably connected to the closure body. The connecting sleeve can either be subsequently pushed into the tooth part or is already bonded thereto or pressed therein. Finally, the dental prosthesis is sealed with the closure body in that the closure body is screwed and/or snapped into the connecting sleeve.

BRIEF DESCRIPTION OF THE SEVERAL VIEWS OF THE DRAWINGS

Further details, features, feature (sub)combinations, advantages, and effects based on the invention result from the following description of preferred exemplary embodiments of the invention and the drawings. The following is shown FIG. 1 a schematic sectional view of a first exemplary embodiment of the dental prosthesis according to the invention with a threaded connection.

The figures are merely exemplary in nature and are only used for understanding the invention. The same elements are usually provided with the same reference numerals.

DETAILED DESCRIPTION OF THE INVENTION

Figure 1:
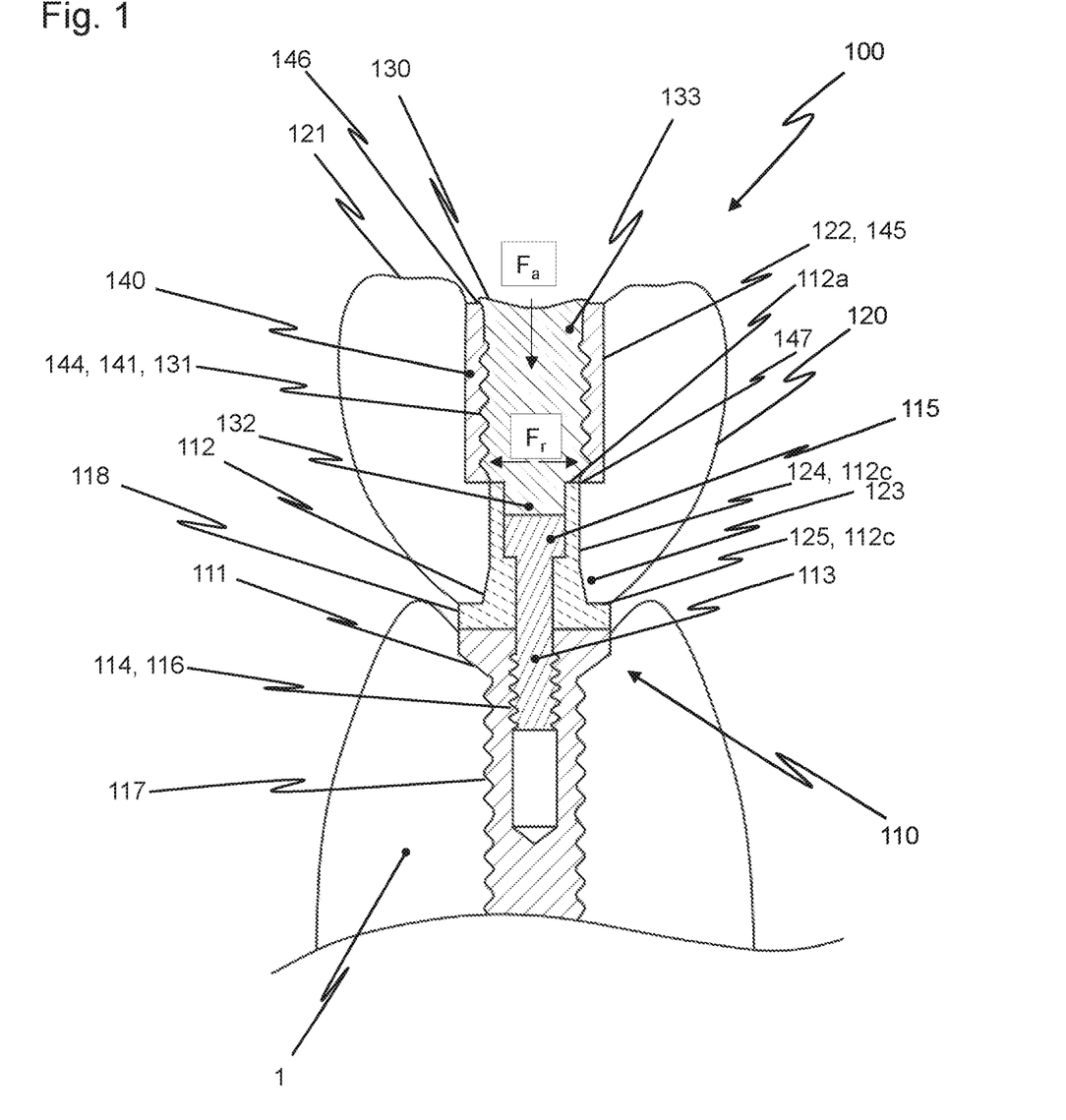

FIG. 1 shows a first exemplary embodiment of a dental prosthesis 100 according to the invention on the basis of a schematic sectional illustration. The dental prosthesis 100 comprises a dental implant 110 and a tooth part 120. The tooth implant 110 in turn has an implant body 111 and a structural element 112, which are shown here in two parts. Both the structural element 112 and the implant body 111 each comprise a connecting section 113, the connecting section 113 of the implant body 111 being provided with an internal thread 114. A connecting element 115, in particular a connecting screw or implant screw, with a corresponding external thread 116 engages in the internal thread 114 of the dental implant 110. The implant body 111 also comprises an external thread 117 which is screwed into the jawbone 1 of a patient and firmly connected thereto. The dental implant 110 is preferably made of a metallic material, in particular containing a titanium compound, and/or is made of zirconium oxide.

In this exemplary embodiment, the structural element 112 has a flange section 118 on which the tooth part 120, here a crown as an example, rests with a lower end assigned to the tooth implant 110 for transferring the forces and torques that occur during chewing and/or biting. The upper end of the tooth part 120 is designed as a chewing surface 121. A substantially cylindrical internal guide 122 penetrates the tooth part 120 in the axial direction along the longitudinal axis thereof and has a radially inwardly facing collar section 123 in the area of the lower end of the tooth part 120, which collar section also terminates flush with the structural element 112 or positively adjoins it in the radial direction for the transmission of the forces and torques that occur during chewing and/or biting. Preferably, the fit of the tooth part 120 on the structural element 112 is conical. A connecting sleeve 140 is arranged inside the internal guide 122 and optionally firmly bonded to the surface of the internal guide 122. The radially external outer surface of the connecting sleeve 140, like the inwardly facing surface of the internal guide 122, is flat, in particular smooth, with a very low surface roughness. The connecting sleeve 140 has a first internal thread 141 on the inside. The connecting sleeve 140 is preferably formed from a plastic material which has a lower hardness than the material of the tooth part 120. In another variant, for example in the event that the tooth part 120 consists of a glass ceramic (e.g. a lithium disilicate glass ceramic), the connecting sleeve 140 can have a greater hardness and/or strength than the material of the tooth part 120, e.g. stabilized zirconium oxide, in order to stabilize the tooth part 120. In this variant, it is conceivable to press the tooth part 120 onto the connecting sleeve 140.

A closure body 130 arranged inside the connecting sleeve 140 has a complementary external thread 131 which engages in the first internal thread 141 of the connecting sleeve 140. The upper section 133 of the closure body 130 is designed as an occlusal or chewing surface which is flush with the upper end of the tooth part 120. The lower section 132 of the closure body 130 opens into the connecting section 113 of the dental implant 110 and in particular terminates flush with the connecting element 115. If the connecting element 115 is designed as a connecting screw, it is conceivable for the lower section 132 of the closure body 130 to be designed with a spring element or a projection which positively engages the helical groove, whereby the closure body 130 simultaneously acts as an anti-twist device for the connecting element 115. The upper section 133 of the closure body 130 protrudes from the connecting sleeve 140 and can, for example, be filed off in the patient's mouth and brought to a level with the chewing surface 121 of the tooth part 120. As the closure body 130 is screwed into the connecting sleeve 140 by means of the threaded connection 131, 141, an axial pressing force $F_a$ is exerted downwards, in the direction of the tooth implant 110, on the one hand, which holds the tooth part 120, more precisely its collar section 123, between the connecting sleeve 140 and the structural element 112, more precisely the flange section 118. On the other hand, a radial pressing force $F_r$ is exerted outwards, in the direction of the tooth part 120, whereby the connecting sleeve 140 is releasably connected to the tooth part 120 in a non-positive and/or frictional manner. In this manner, any adhesive connections can preferably be dispensed with.

In this embodiment, the connecting sleeve 140 can be aligned coaxially with structural element 112 in the internal guide 122 penetrating the tooth part 120. With regard to the chewing surface 121 (top), the connecting sleeve 140 is arranged axially above the structural element 112, wherein the lower annular surface 147 of the connecting sleeve 140 axially adjoins the upper end 112a of the structural element 112.

A force and/or torque transmission takes place exclusively in the lower collar section 123 of the tooth part 120, via the inner surface 124 and bottom surface 125 thereof, on the positively adjoining outer support surfaces 112c of the structural element 112 designed as a load-bearing component.

It is particularly advantageous if the closure body 130 and the tooth part 120 consist of the same ceramic material and/or are milled from a common ceramic block.

Figure 2:
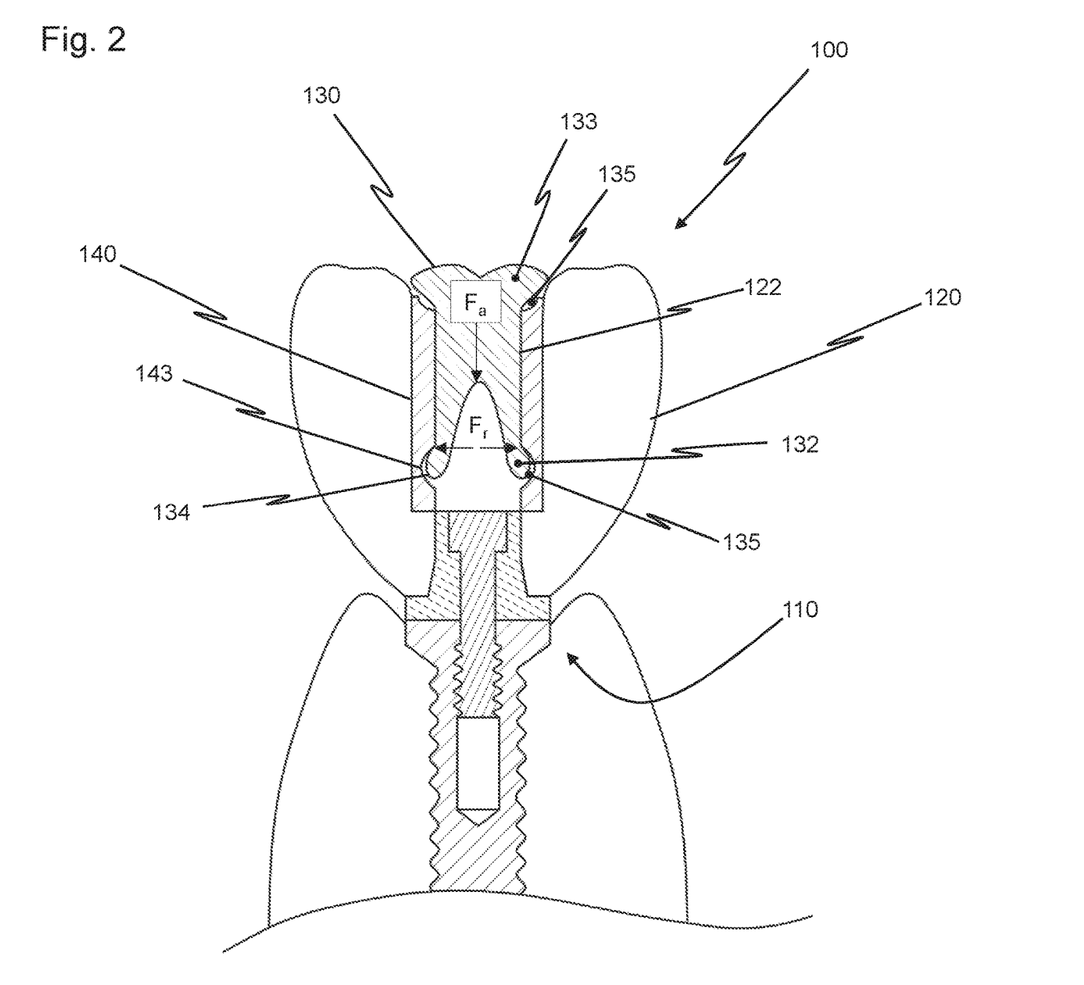
FIG. 2 a schematic sectional view of a second exemplary embodiment of the dental prosthesis according to the invention with a snap connection.

A second exemplary embodiment of a dental prosthesis 100 according to the invention is shown in FIG. 2 as a schematic sectional illustration. The dental prosthesis 100 shown here is basically the same as the first exemplary embodiment described above, which is why only the differences are explained in more detail below. The second exemplary embodiment of the dental prosthesis 100 according to the invention differs from the first exemplary embodiment described above essentially in the design of the releasable connection between the closure body 130 and the connecting sleeve 140, which is implemented here as a snap connection. The connecting sleeve 140 is provided with a circumferential groove 143 on the inside, which is designed to engage with complementarily arranged spring elements 134 of the closure body 130. If the closure body 130 is inserted into the connecting sleeve 140 arranged within the internal guide 122 of the tooth part 120, the spring elements 134 spring radially inward and, upon reaching the groove 143, snap into it. Due to the snap connection, on the one hand, a radial pressing force $F_r$ is exerted outwards, in the direction of the tooth part 120. Due to the radial pressing force $F_r$, a non-positive and/or frictional engagement is achieved between the connecting sleeve 140 and the tooth part 120. On the other hand, an axial pressing force $F_a$ is exerted downwards, in the direction of the tooth implant 110. Sealing slots 135 are respectively formed between the closure body 130 and the connecting sleeve 140, in the area of the lower section 132 and/or of the upper section 133 of the closure body 130. Seals (not shown here), e.g. in the form of a sealing washer, a sealing cone, an O-ring, or some other suitable seal design, can be arranged within the sealing slots 135, in particular within the groove 143 of the connecting sleeve, to increase the tightness between the closure body 130 and the connecting sleeve 140. The seals are held within the respective sealing slots 135 due to the radial pressing force $F_a$, among other things.

Figure 3:
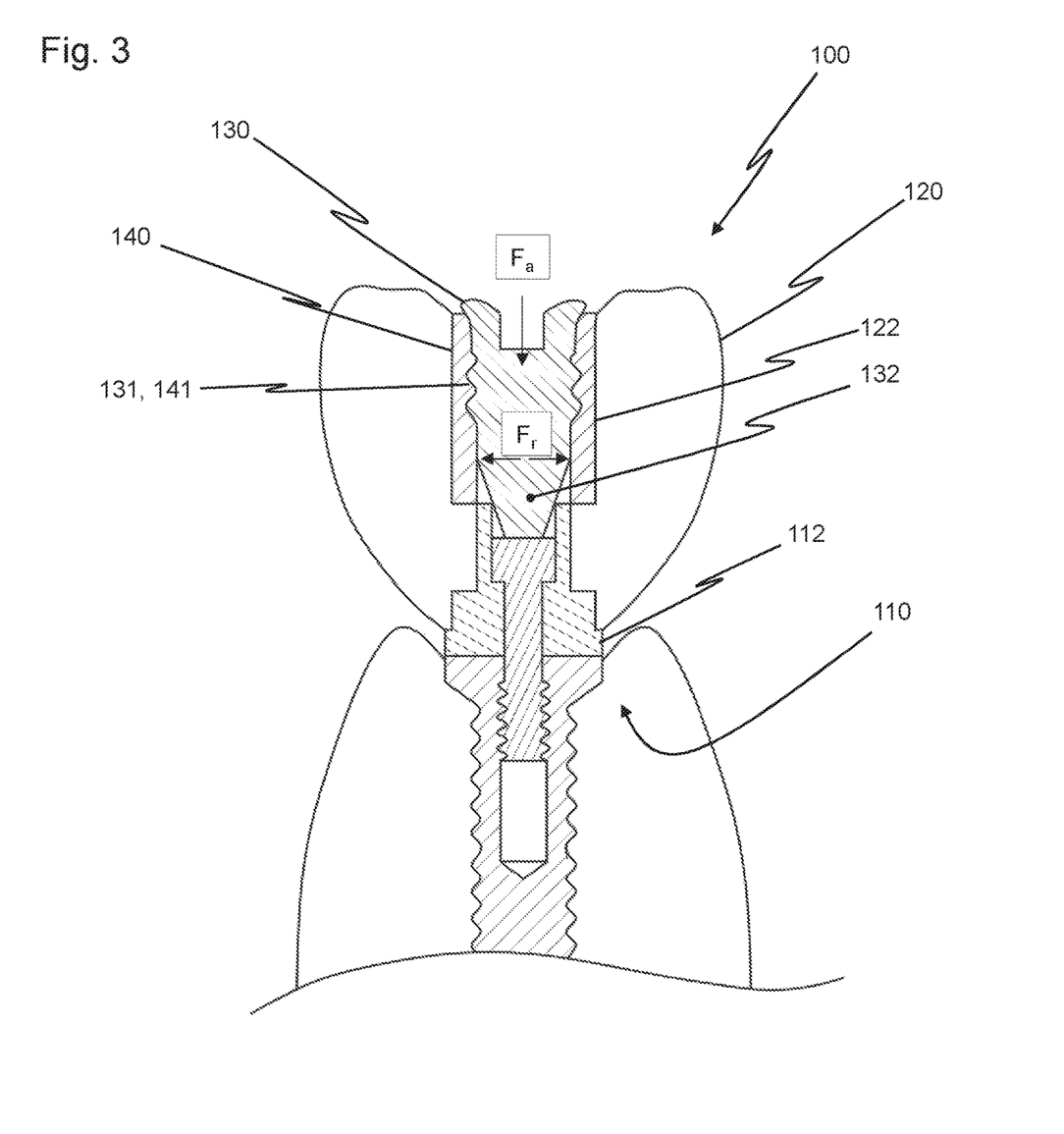
FIG. 3 a schematic sectional view of a third exemplary embodiment of the dental prosthesis according to the invention with a double threaded connection.

The third exemplary embodiment, which is shown schematically as a section in FIG. 3, is fundamentally similar to the first exemplary embodiment of the dental prosthesis 100 according to the invention as shown in FIG. 1. The connecting sleeve 140 comprises a first internal thread 141. As in the first exemplary embodiment according to FIG. 1, the first internal thread 141 is provided for engagement with an external thread 131 of the closure body 130. In this embodiment, the closure body 130 has a cone-like shape or a truncated cone at its lower section 132. The connection to the tooth part 120, the internal guide 122 of which here has a steady course without the collar section 123 (see FIG. 1), is carried out, in turn, via the connecting sleeve 140. For this purpose, the outer surface of the connecting sleeve 140 can either be bonded to and/or pressed into the inner surface of the internal guide 122 of the tooth part 120; however, a non-positive and/or frictional connection is also possible due to the radial pressing force $F_r$ acting in the direction of the tooth part 120.

Figure 4:
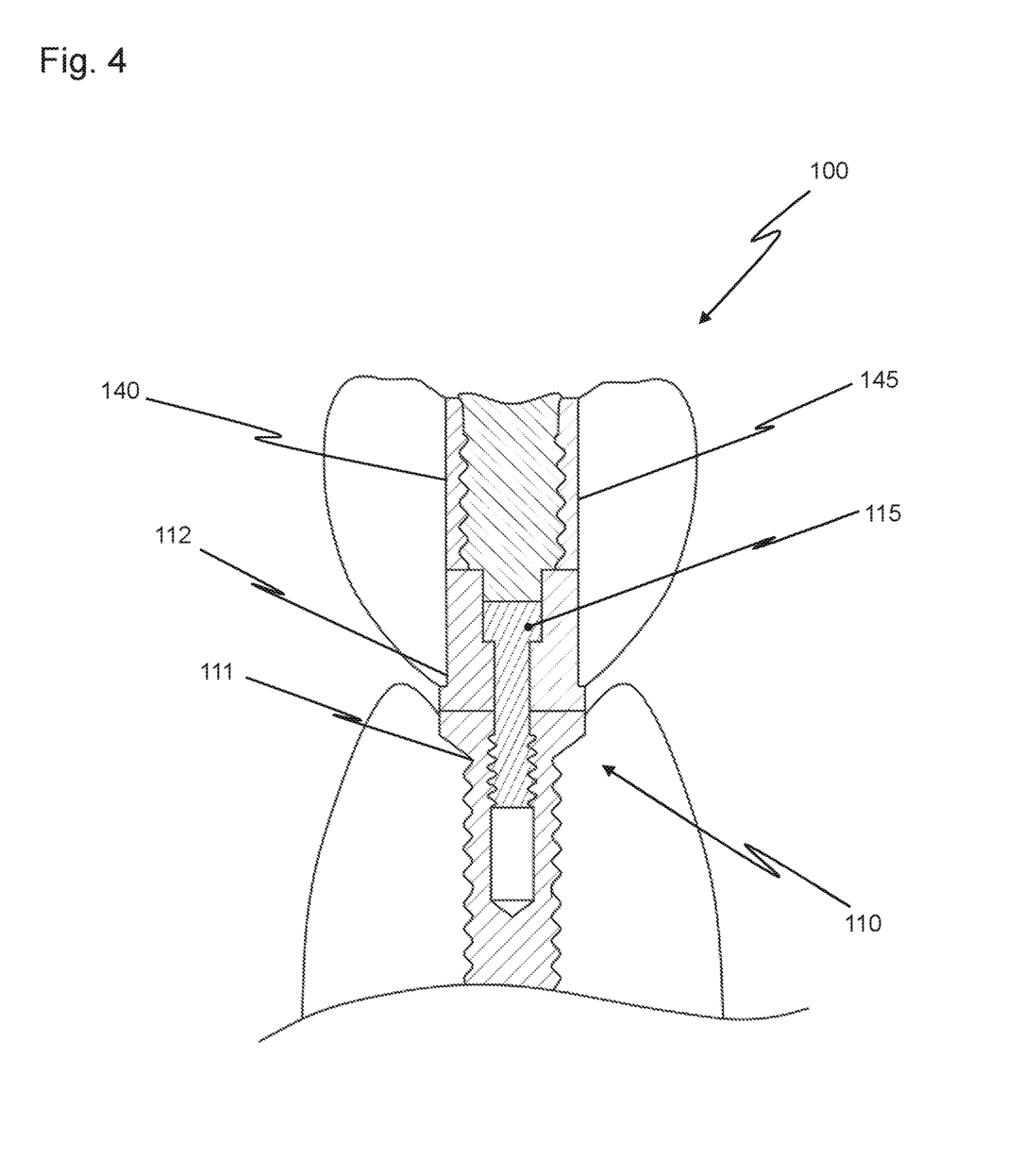
FIG. 4 a schematic sectional view of a fourth exemplary embodiment of the dental prosthesis according to the invention, wherein the connecting sleeve and the structural element are formed as one piece.

The fourth exemplary embodiment of a dental prosthesis 100 according to the invention as shown in FIG. 4 essentially corresponds to the first exemplary embodiment shown in FIG. 1. In contrast to this, the outer jacket surface 145 of the connecting sleeve 140 and the outer jacket surface of the structural element 112 in this embodiment adjoin flush with one another. The connecting element 115, in particular an implant screw, thus connects the connecting sleeve 140 directly to the implant body 111. In this manner, the number of required individual components of the dental prosthesis 100 and the connections between the components can be reduced overall.

Figure 5:
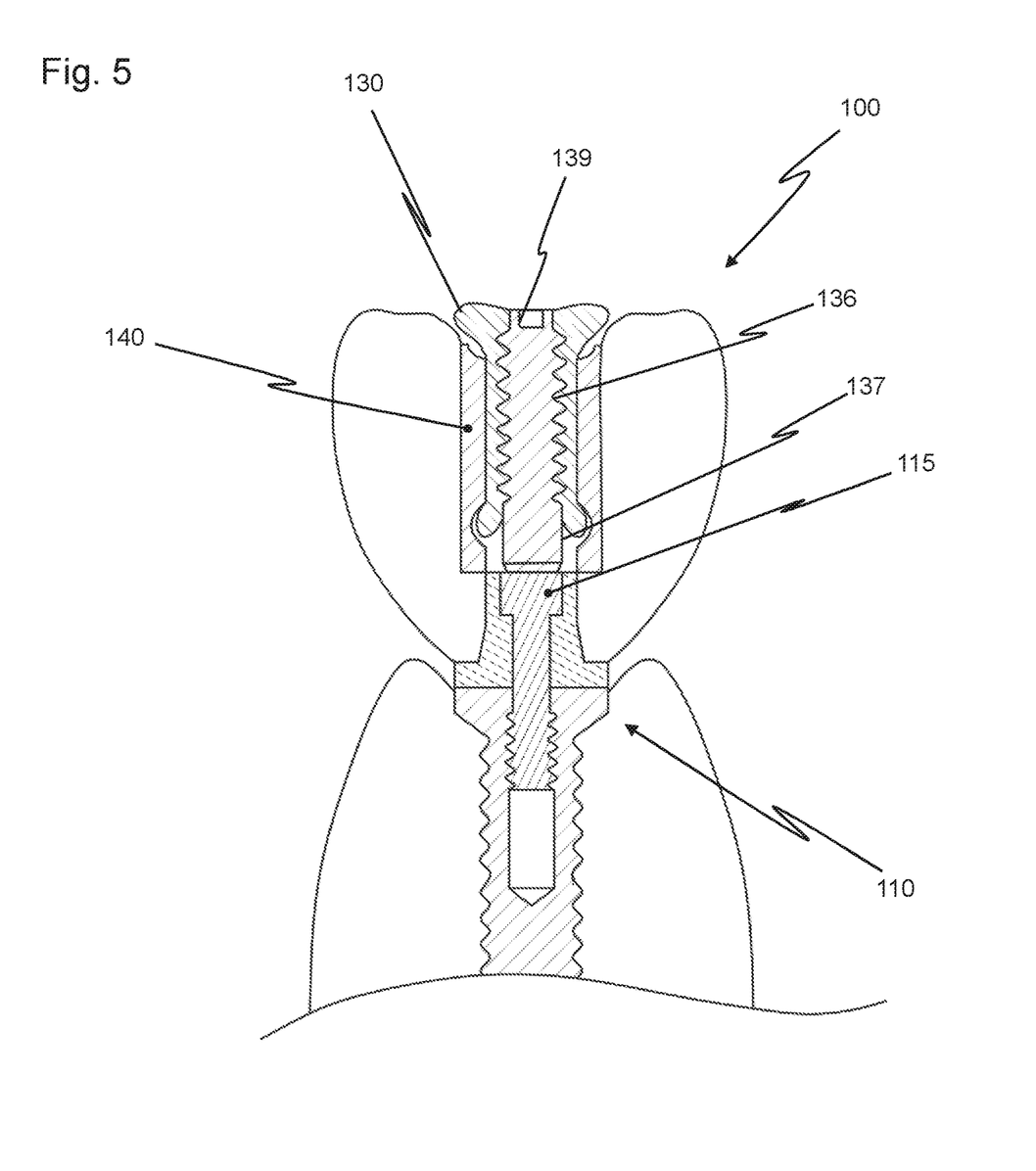
FIG. 5 a schematic sectional view of a fifth exemplary embodiment of the dental prosthesis according to the invention with an inner recess of the closure body and a grub screw.

FIG. 5 shows a fifth exemplary embodiment of a dental prosthesis 100 according to the invention, which essentially corresponds to the second exemplary embodiment shown in FIG. 2. The closure body 130 shown here, however, additionally has an inner recess 136 in which a core element is arranged, which core element is a grub screw 137 in the specific exemplary embodiment. The core element or the grub screw 137 is screwed to the closure body 130 with an internal thread within the inner recess 136. The lower end of the core element or the grub screw 137 faces the direction of the connecting element 115 or the implant screw. If the core element or the grub screw 137 is screwed further into the closure body 130, i.e. in the direction of the dental implant 110, its lower end is supported on the connecting element 115 or the implant screw, causing the closure body 130 to be "screwed upwards," out of the connecting sleeve 140. On its upper end, the core element or the grub screw 137 has a tool holder 139 in which a dentist could, for example, engage with an Allen key in order to remove the closure body 130 from the connecting sleeve 140 and thus gain access to the dental implant 110 underneath. Alternatively, and not shown here, the connecting sleeve 140 and the closure body 130 can each be conical in shape in order to produce a common sealing surface. The conical closure body 130 can then be unscrewed from the connecting sleeve 140 by means of the core element or the grub screw 137.

Figure 6:
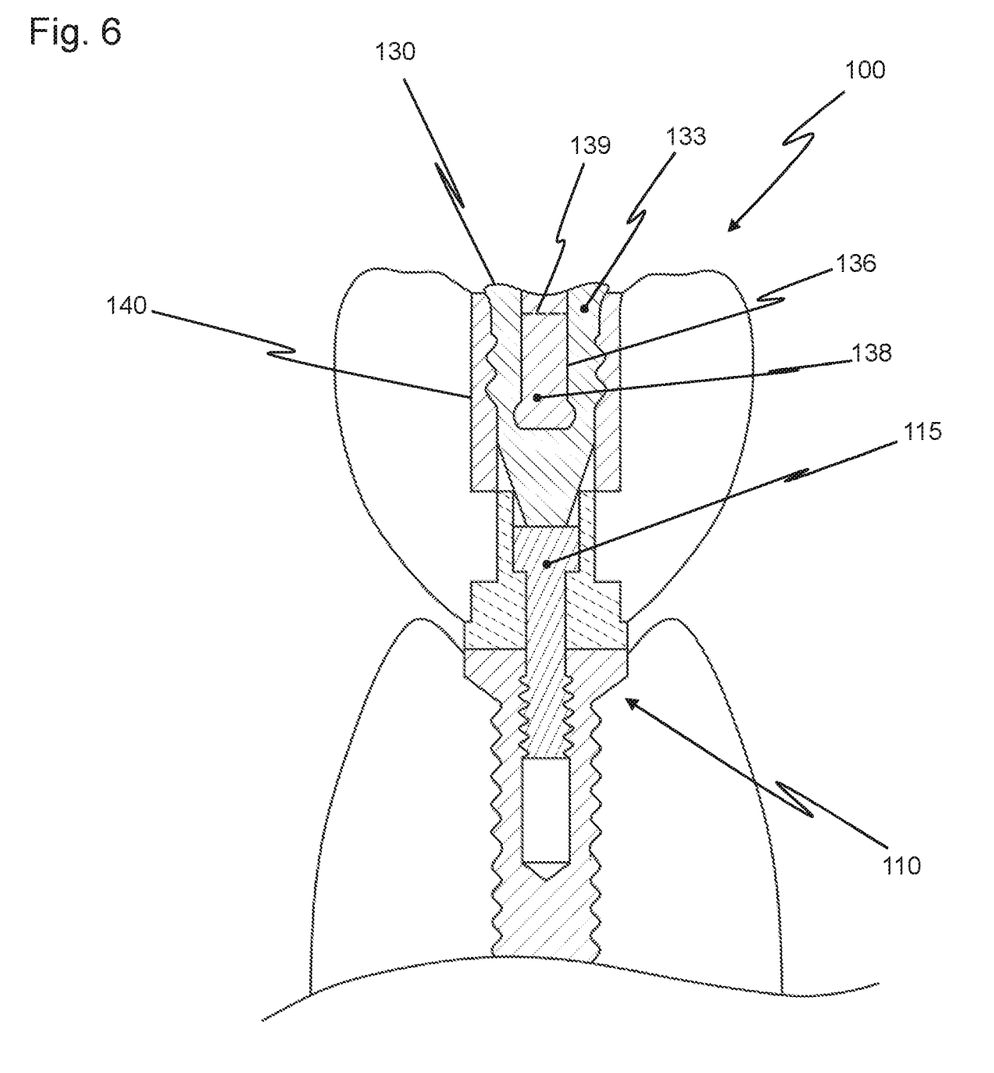
FIG. 6 a schematic sectional view of a sixth exemplary embodiment of the dental prosthesis according to the invention with an inner recess of the closure body and a silicone core.

The sixth exemplary embodiment of a dental prosthesis 100 according to the invention shown in FIG. 6 differs from the third exemplary embodiment according to FIG. 3 also in that the closure body 130 has an inner recess 136, which is provided here for receiving a core element, in particular a silicone core 138. The closure body 130 is screwed into the connecting sleeve 140 and has a tool holder 139, indicated here by dashed lines, in its upper section 133 in order to unscrew the closure body 130 from the connecting sleeve 140 by engaging a corresponding tool, in particular an Allen key. The core element or the silicone core 138 is used for protection and/or for sealing the tool holder 139. In order to gain access to this, the core element or the silicone core 138 can be compressed and then springs back into its original position. Alternatively, the core element or the silicone core 138 can also be completely removed from the inner recess 136 with a suitable tool.

Figure 7:
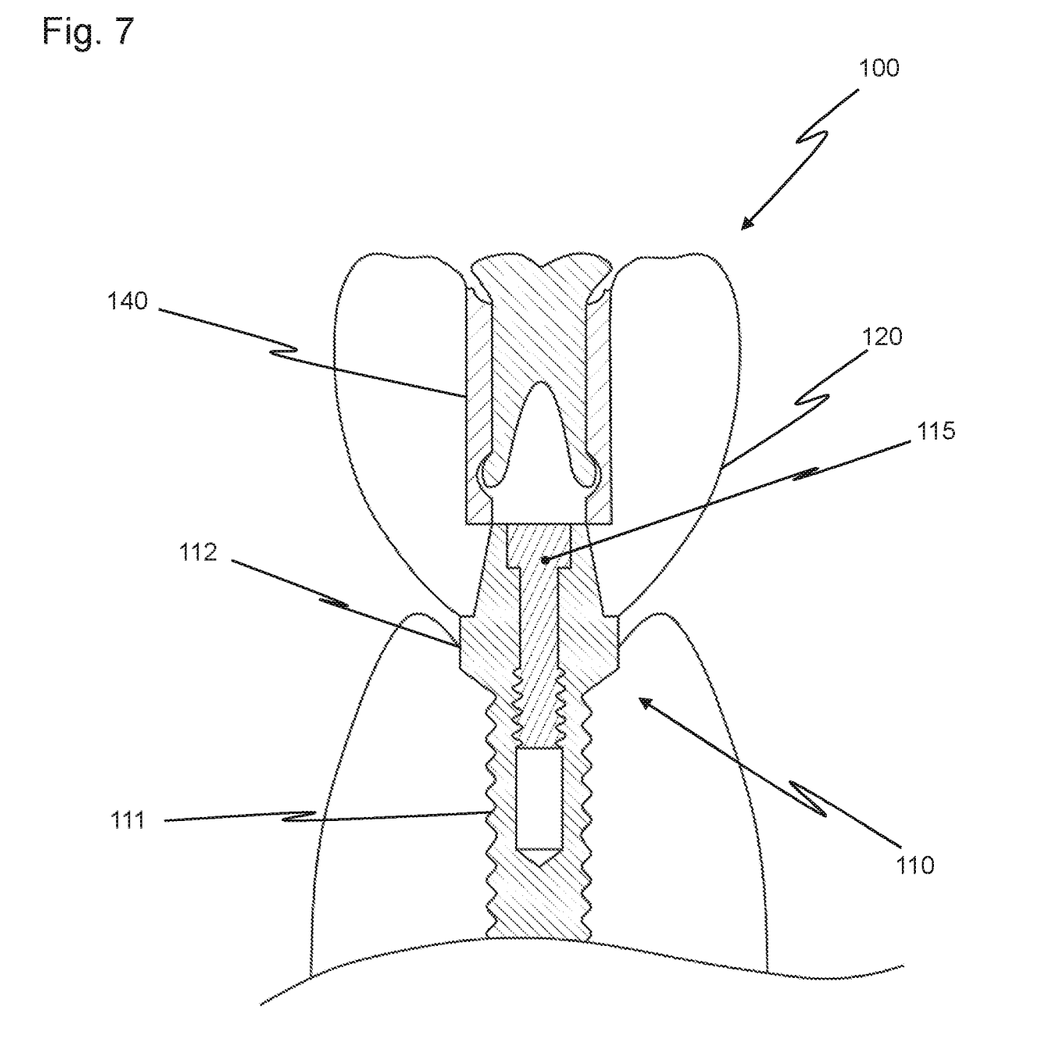
FIG. 7 a schematic sectional view of a seventh exemplary embodiment of the dental prosthesis according to the invention with a one-piece dental implant.

The seventh exemplary embodiment of a dental prosthesis 100 according to the invention as shown in FIG. 7 essentially corresponds to the second exemplary embodiment shown in FIG. 2. In contrast to this, the implant body 111 and the structural element 112 are designed as a one-part and/or one-piece dental implant 110. In addition, the connecting sleeve 140 has an inwardly directed collar section in its lower area pointing in the direction of the dental implant 110, so that the connecting sleeve 140 can be connected to the dental implant 110 via this collar section by means of the connecting element 115, in particular an implant screw. This embodiment enables a special treatment method in which, for example, initially a temporary, i.e. provisional, tooth part is connected to the dental implant 110 by means of the connecting element 115 and the connecting sleeve 140. After the final tooth part 120, for example a crown, has been completed, the temporary can be easily removed by means of the screw connection and replaced by the crown. The final tooth part 120 or the crown can optionally and/or if necessary also be screwed or cemented to the structural element 111.

Figure 8:
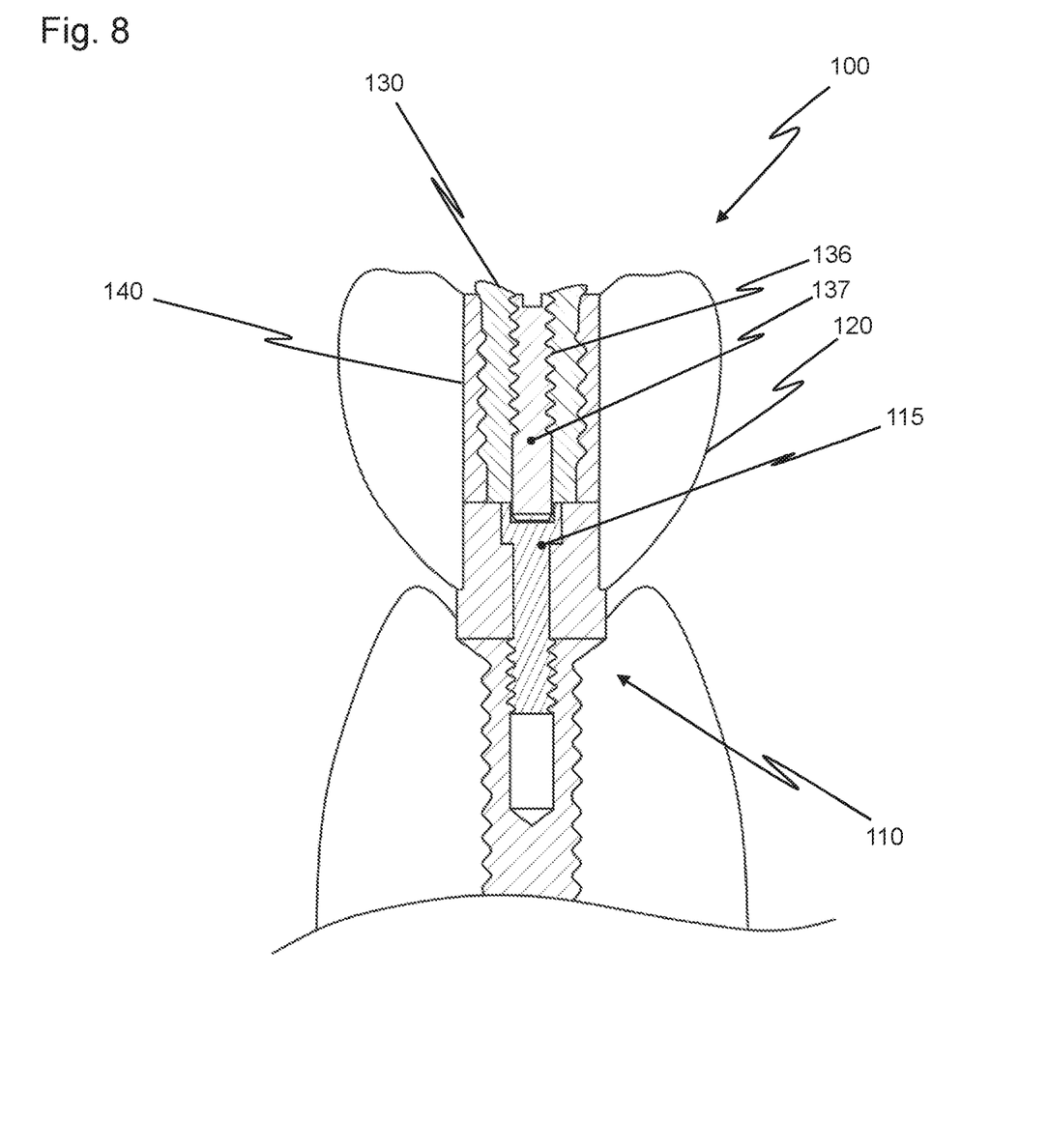
FIG. 8 a schematic sectional view of an eighth exemplary embodiment of the dental prosthesis according to the invention with an inner recess of the closure body and a grub screw, as well as a one-piece tooth implant.

Finally, FIG. 8 shows an eighth exemplary embodiment of a dental prosthesis 100 according to the invention, which essentially corresponds to the first exemplary embodiment shown in FIG. 1. In turn, the closure body 130 shown here is provided with an inner recess 136 and a core element 137 arranged therein and designed as a grub screw. The lower end of the core element or the grub screw 137 facing the tooth implant 110 protrudes into the upper end of the connecting element 115, i.e. into the screw head of the implant screw, so as to prevent rotation, in particular in a positive-locking manner. In this embodiment, the dental implant 110 is in one piece and/or in one part or optionally in two pieces. The connecting sleeve 140 and the closure body 130 are screwed to one another, wherein an inner diameter of the closure body 130 rests on the screw head of the implant screw, i.e. the connecting element 115. In order to release the closure body 130 and/or the connecting sleeve 140 from the tooth part 120, the core element or the grub screw 137 can therefore first be removed. The connecting element 115 is then unscrewed from the dental implant 110 and pushes the closure body 130 with its upper end or the screw head, possibly together with the connecting sleeve 140, out of the interior of the tooth part 120. If the tooth part 120 is bonded to the connecting sleeve 140, it can be removed at the same time.

Figure 9:
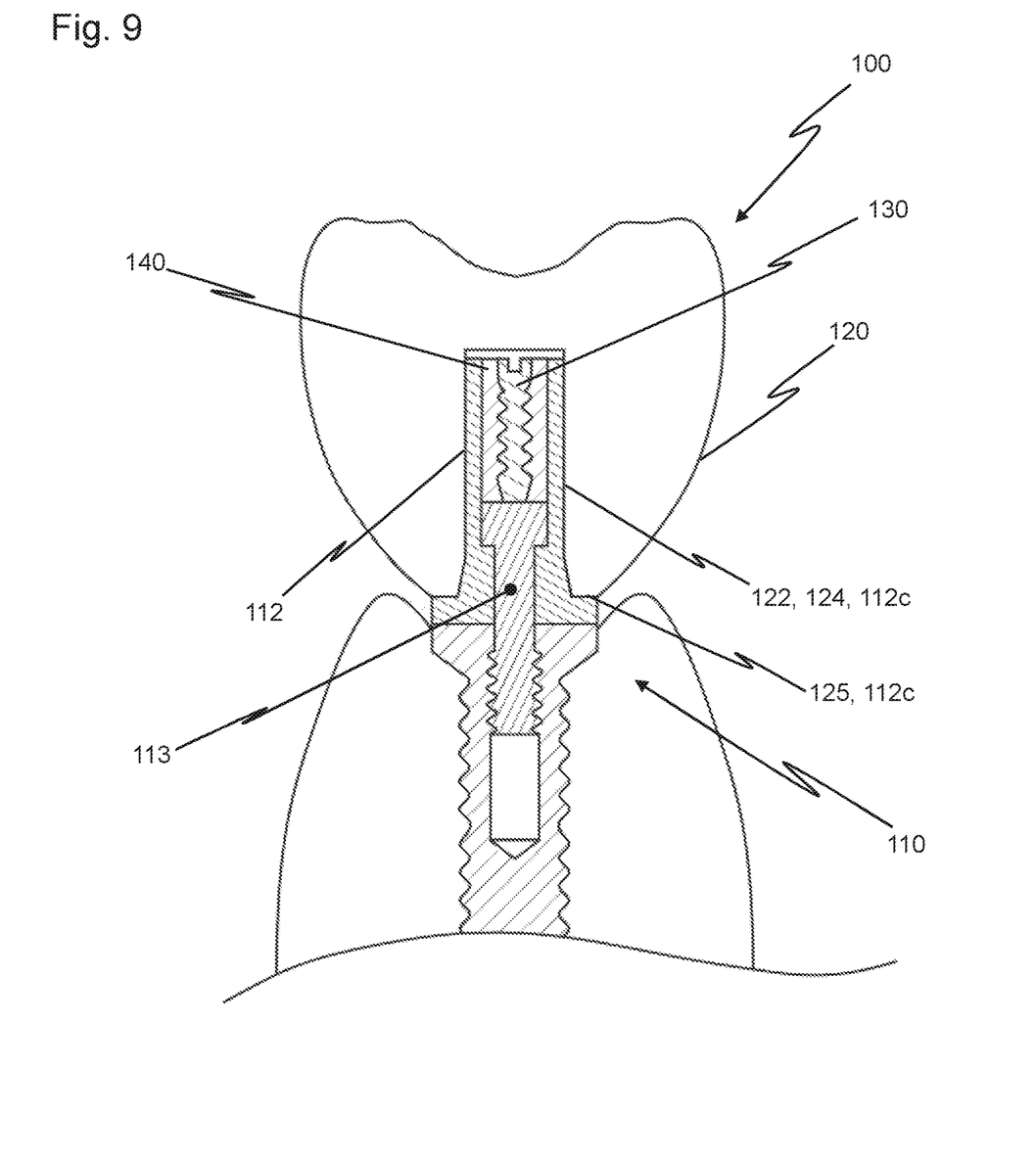
FIG. 9 a schematic sectional view of a ninth exemplary embodiment of the dental prosthesis according to the invention, wherein the dental prosthesis is firmly connected, particularly bonded, to the structural element.

A ninth embodiment of a dental prosthesis 100 according to the invention is shown in FIG. 9. In this exemplary embodiment, the tooth part 120 has an internal guide 122 arranged in its lower region assigned to the tooth implant 110. The internal guide 122 is designed here in the form of a recess which does not completely penetrate the tooth part 120. The structural element 112 is arranged within the internal guide 122. Since no completely penetrating internal guide 122 is provided in this embodiment, it is necessary to bond the tooth part 120 or the inner surface 124 of the internal guide 122 and its bottom surface 125 to the structural element 112 or to its support surfaces 112c. Subsequent access to the structural element 112 or the tooth implant 110 is not provided here. In order to avoid the problem described at the beginning of the connecting element 113, which is an implant screw here, becoming loose, the connecting sleeve 140 is arranged together with the closure body 130 within the structural element 112, even completely within in this representation, or completely surrounded by the structural element 112.

By means of this design, a force and/or torque transfer of forces occurring when chewing or biting takes place on or indirectly via the connecting sleeve 140.

The features described in the respective embodiments can be combined with one another as desired in a technically meaningful manner.

Overall, the dental prosthesis 100 according to the invention offers the particular advantage that any connections between the tooth implant 110, tooth part 120, and/or closure body 130 are executed indirectly or directly via the connecting sleeve 140, in particular releasably. The connections can be implemented as threaded connections 131, 141; 119, 142, a snap connection 134, 143, or by means of corresponding pressing forces $F_a$, $F_r$. Bonded connections are preferably completely dispensed with.

According to the invention, a kit is also provided for retrofitting which comprises at least the closure body 130 and the connecting sleeve 140, each according to one of the exemplary embodiments described. In addition, the tooth part 120 and/or the structural element 112 may be included in the kit, optionally with the connecting element 115.

LIST OF REFERENCE NUMERALS

1 Jawbone
100 Dental prosthesis
110 Dental implant
111 Implant body
112 Structural element (abutment)
112a Upper end of the structural element
112b Lower end of the structural element
112c Support surfaces of the structural element
113 Connecting section
114 Internal thread of the dental implant
115 Connecting element (implant screw)
116 External thread of the connecting element
117 External thread of the implant body
118 Flange section
119 External thread of the structural element
120 Tooth part
121 Chewing surface
122 Internal guide
123 Collar section
124 Top surface, inner surface of the internal guide
125 Bottom surface of the tooth part
130 Closure body
131 External thread of the closure body
132 Lower section of the closure body
133 Upper section of the closure body
134 Spring element
135 Sealing slot
136 Inner recess of the closure body
137 Core element (grub screw)
138 Core element (silicone core)
139 Tool holder
140 Connecting sleeve
141 First internal thread of the connecting sleeve
142 Second internal thread of the connecting sleeve
143 Groove
144 Inner jacket surface of the connecting sleeve
145 Outer surface, outer jacket surface of the connecting sleeve
146 Upper annular surface of the connecting sleeve
147 Lower annular surface of the connecting sleeve
$F_a$ Axial pressing force
$F_r$ Radial pressing force

The invention claimed is:
1. A dental prosthesis (100) for anchoring in the jawbone (1), comprising:
a dental implant (110) with an implant body (111), an abutment (112), a closure body, a tooth part, a connecting sleeve and a connecting element; wherein the dental implant (110) comprises a connecting section (113) within the implant body (111) to secure the abutment with the dental implant using the connecting element (115), wherein the closure body (130) is configured to be arranged within an internal guide (122) arranged in the tooth part (120), and extending into the connecting section (113) penetrating the abutment (112) and terminates flush with the connecting element for sealing the dental prosthesis; wherein the connecting sleeve (140) is arranged between the closure body (130) and the internal guide (122) of the tooth part (120), wherein the connecting sleeve (140) has a flat smooth outer surface (145) and the internal guide (122) has a flat smooth inner surface, so that the connecting sleeve (140) is pushed smoothly into the internal guide (122) arranged in the tooth part (120), and wherein the tooth part (120) and the tooth implant (110) are configured to be connected to one another indirectly, releasably by the connecting sleeve (140).

2. The dental prosthesis (100) according to claim 1 characterized in that the connecting sleeve (140) is designed as a—rotationally symmetrical, hollow cylinder with an outer jacket surface (145) and an inner jacket surface (144) as well as an upper annular surface (146), which is oriented to face in the same direction as a chewing surface (121) of the tooth part (120), and a lower annular surface (147), which is oriented to face the abutment (112) or to the dental implant (110).

3. The dental prosthesis (100) according to claim 2, characterized in that the connecting sleeve (140) can be aligned coaxially with the abutment (112) in the internal guide (122) arranged in the tooth part (120), wherein either the lower annular surface (147) of the connecting sleeve (140) terminates axially at or above an upper end (112*a*) of the abutment (112), or the connecting sleeve (140) is surrounded by the abutment (112), and the upper annular surface (146) of the connecting sleeve (140) terminates at or below the upper end (112*a*) of the abutment (112).

4. The dental prosthesis (100) according to claim 3, characterized in that the closure body (130) has an external thread (131) and the connecting sleeve (140) has at least one internal thread (141, 142) in order to releasably lock the closure body (130) within the internal guide (122) arranged in the tooth part (120).

5. The dental prosthesis (100) according to claim 4, characterized in that the abutment (112) has an external thread (119) for engagement in at least one internal thread (141, 142) of the connecting sleeve (140) in order to releasably connect the dental implant (110) to the connecting sleeve (140).

6. The dental prosthesis (100) according to claim 4, characterized in that a collar section (123) of the tooth part (120) is arranged between the connecting sleeve (140) and the abutment (112) of the tooth implant (110) in order to releasably connect the tooth part (120) and the dental implant (110) to one another by the connecting sleeve (140).

7. The dental prosthesis (100) according to claim 4, characterized in that the closure body (130) has an inner recess (136), for receiving a core element (137, 138).

8. The dental prosthesis (100) according to claim 4, characterized in that the connecting sleeve (140) has a flat, smooth, outer surface or outer jacket surface (145), and the internal guide (122) arranged in the tooth part (120) has a flat, smooth, surface.

9. The dental prosthesis (100) according to claim 8, characterized in that the connecting sleeve (140) comprises a material which has a lower hardness than the hardness of the material of the tooth part (120).

10. The dental prosthesis (100) according to claim 9, characterized in that the tooth part (120), the connecting sleeve (140), or the closure body (130) are designed with a respective coloring material component corresponding to a natural tooth color.

11. The dental prosthesis (100) according to claim 1, characterized in that at least one seal is arranged between the closure body (130) and the connecting sleeve (140).

* * * * *

UNITED STATES PATENT AND TRADEMARK OFFICE
CERTIFICATE OF CORRECTION

PATENT NO. : 12,426,997 B2
APPLICATION NO. : 17/297685
DATED : September 30, 2025
INVENTOR(S) : Christoph Raiser Page 1 of 1

It is certified that error appears in the above-identified patent and that said Letters Patent is hereby corrected as shown below:

In the Claims

In Column 15, Line 17, under Claim 2:
Delete the word "to" in between the words "or" and "the".

Signed and Sealed this
Eighteenth Day of November, 2025

John A. Squires
*Director of the United States Patent and Trademark Office*